Jan. 8, 1963    H. LEMMER    3,072,288
RUPTURE DISC VACUUM SUPPORT
Filed Feb. 15, 1960    2 Sheets-Sheet 1

HORACE LEMMER
INVENTOR

BY Cumpston + Shaw
ATTORNEYS.

Jan. 8, 1963 H. LEMMER 3,072,288
RUPTURE DISC VACUUM SUPPORT
Filed Feb. 15, 1960 2 Sheets-Sheet 2

HORACE LEMMER
INVENTOR

BY Cumpston + Shaw
ATTORNEYS.

United States Patent Office 3,072,288
Patented Jan. 8, 1963

3,072,288
RUPTURE DISC VACUUM SUPPORT
Horace Lemmer, 13 Decary Place, Dorval, Quebec, Canada
Filed Feb. 15, 1960, Ser. No. 8,850
6 Claims. (Cl. 220—89)

This invention relates to supports for rupture discs, and particularly to supports for dome-shaped rupture discs, one object of the present invention being to provide a support for such rupture discs when the same are used on equipment handling vacuums or comparatively low pressures.

In the past, it has been found that when a rupture disc is used on equipment handling comparatively low pressures and occasional vacuums, the frangible diaphragm or rupture disc must be constructed of such thin material in order to open up and provide relief when the pressure reaches a predetermined point, that it will often deform or collapse under external pressure. Attempts have been made to internally support the rupture discs by providing a similarly shaped dome member which is positioned inboard of the rupture disc and which is provided with a series of laterally extending slots (from 1/16 to 1/8 inch wide) which in turn divide the domed supporting member into a plurality of sector-shaped tongues which will open up under a sudden rush of fluid or gas pressure. This construction has not been entirely satisfactory because the slots tend to materially reduce the life of the rupture disc, particularly when the discs are formed of rather thin metal. The reversal vacuum cycle tends to pull the rupture disc into the slots, causing mechanical deformation which in turn causes the disc to fail prematurely. Attempts have been made to overcome this problem by covering the slots with metal strips to provide support for the rupture disc in the area normally left unsupported by the slots. However, the addition of the metal strips only slightly decreases the amount of physical deformation of the rupture disc and has not proven to be a satisfactory solution to the problem. Moreover, the modified device is more expensive to manufacture and consequently is sold at premium prices.

There are other types of known supports in which the dome portion of the support is weakened by a series of radially extending perforations, a series of substantially concentric slots, or a series of perforations lying both in radial and substantially concentric rows. However, these types are all subject to the disadvantage that the rupture disc is unsupported at the perforations or slots, and consequently, is vulnerable to pressure reversals which tend to draw the thin rupture disc into the perforations or slots. This mechanical deformation of the rupture disc substantially reduces its useful life.

Another object of the present invention is, therefore, to provide a vacuum support which will engage the under surfaces of the rupture disc and which will support the same in a uniform manner substantially throughout the full area of the disc.

Another object is to provide a vacuum support having a smooth, uniform external surface, which eliminates the mechanical deformation normally resulting from pressure reversals and which thereby prevents premature fracturing or rupturing of the disc.

Another object is to provide a novel and efficient method for making a vacuum support having the above advantages.

A further object is to provide a vacuum support of the above character which will open up to permit the rupture disc to rupture when subjected to a predetermined pressure differential.

Still a further object is to provide a vacuum support having the above advantages which does not interfere with the normal functioning of the rupture disc and which may be readily and economically manufactured, is highly reliable in operation, and requires a minimum of parts.

To these and other ends the invention resides in certain improvements and combinations of parts, all as will be hereinafter more fully described, the novel features being pointed out in the claims at the end of the specification.

The preferred embodiment of the present invention, herein disclosed by way of illustration, is shown, together with the rupture disc, as applied to a tubular fitting 21 for equipment handling internal pressures greater and less than atmospheric pressure.

Figure 1:
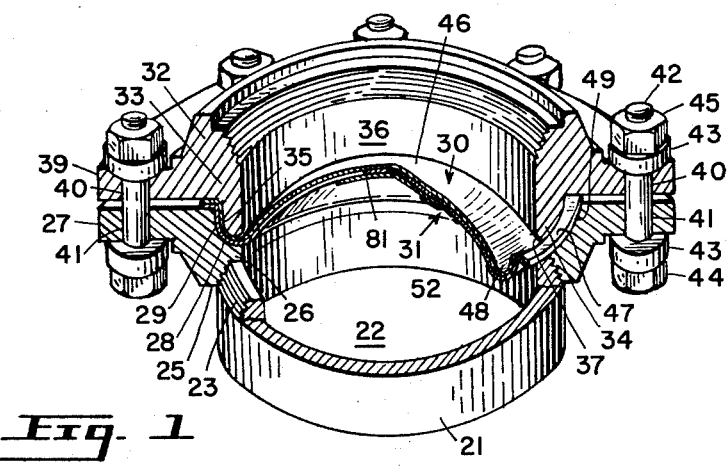
FIG. 1 is a perspective view partly in section of a rupture disc vacuum support assembly embodying the present invention and mounted in sealing position.

As shown in FIG. 1, fitting 21 has an internal passage diameter sufficient to provide a flow passageway 22 for the free relief of the pressure. The outer periphery of the fitting 21 is threaded as at 23 to accommodate an internally threaded collar or ring 25 which has an internally extending annular rib 26 to abut against the end of the fitting 21. Ring 25 also includes a radially extending flange 27 encircling shoulder-like recess 28 which in turn has a radially inclined face 29 outside of the rib 26 to provide an angular seat and clamping face for a concavo-convex rupture disc shown generally at 30, and a vacuum support member of concavo-convex shape as shown generally at 31.

Cooperating with the clamping ring 25 is a clamping ring 32 having a collar portion 33 of inner diameter corresponding to the inner diameters of fitting 21 and rib 26. Collar portion 33 also has an annular rib 34 provided with an outer face 35 corresponding with inclined face 29 on ring 25. Face portion 35 is connected to the inner face 36 of the collar by a rounding face 37 which provides a smooth unbroken surface, as shown in FIG. 1.

Clamping ring 32 is also provided with an annular flange portion 39 corresponding with the flange 27 and provided with openings 40 registering with openings 41 in flange 27 to accommodate a series of bolts 42 which are provided with washers 43 between the heads 44 and the flange 27 and between the flange 39 and the nuts 45.

The rupture disc is fabricated to rupture at the required pressure differential and is formed of relatively thin, light-weight, non-corrosive metal readily drawn to shape to provide a central dome portion 46 and an angular anchoring flange 47. The flange 47 extends from the dome portion 46 in a rounding curve 48 corresponding with the curvature of the faces 35 and 37. When in use, the flange 47 is adapted to be clamped and shaped to the curvature of the clamping faces of clamping rings 25 and 32 and the marginal edge 49 may extend outwardly between the flanges of the clamping rings, as shown in FIG. 1.

My novel vacuum supporting member 31 is made of formable, non-corrosive material of sufficient thickness to give the support enough strength to support the dome portion 46 of the rupture disc. Support 31 is provided with a central dome portion 50 which has an outside face 51 conforming to the concave face 52 of the rupture disc. Thus, the rupture disc is supported substantially throughout its entire area. Vacuum support 31 has a circumferentially extending flange 53 which is smoothly curved, as at 54, to conform with curved portion 48 of the rupture disc. The marginal edge of the flange may also terminate in a lightly extending angular rim engaging under the corresponding rim of the rupture disc.

Figure 3:
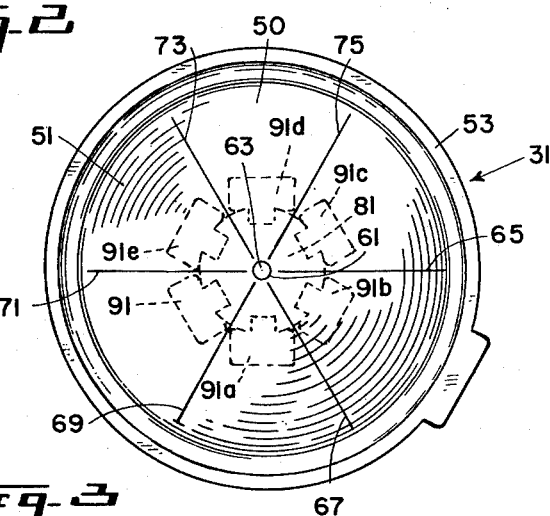
FIG. 3 is a top plan view of the vacuum support shown in FIGS. 1 and 2.

In accordance with my invention, the vacuum support comprises a thin body having a dome-shaped wall adapted to conform substantially to the domed surface of the rupture disc. For the purpose of ease of manufacture, the center portion of the dome may be formed with a small opening 61 which is subsequently filled by a button or disc of metal 63 of substantially the same thickness as support 31. The wall of the dome portion is provided with a plurality of radially extending fissures 65, 67, 69, 71, 73 and 75 (FIG. 3) which extend completely through the wall and extend from an unbroken outer marginal portion to a narrow unbroken central connecting portion which may or may not contain an opening such as opening 61 described above. The fissures define a plurality of sections which extend between the marginal and center connecting portions. Each fissure extends completely through the wall with the sides of the adjacent sections defined by each fissure touching each other for substantially the full length of the fissure. Thus, support 31 has a substantially uninterrupted continuous supporting surface which will support the rupture disc throughout its entire area which at the same time will lift under sudden fluid or gas pressure to allow the disc to rupture. As a result, my support has the same rupturing potential as devices heretofore known, but my support differs materially from such devices in that it has a substantially continuous supporting surface.

The fissures are preferably made after the support is formed into a dome by forming slits in the dome with a reciprocating action machine and a slitting tool, the depth of which may be adjustable. The slits are cut without removal of material, preferably from the outer edge of the support towards the center.

After slitting, the blank is reformed in such a manner that the adjacent respective edges of the slits are in contact with each other for the full length of the slits and the surface of the domed portion of the support is even on each side of each slit leaving only fissures or lines of weakening which are visible but which do not leave any perceptible irregularity in the surface of the support. The fissures or lines of weakening allow support 31 to separate under pressure into segments, but the fissures are so constructed, as described above, that prior to rupture, the support presents an almost continuous surface with no openings or surface irregularities therein. As a result, support 31 supports the rupture disc intimately and throughout its entire area.

Figure 4:
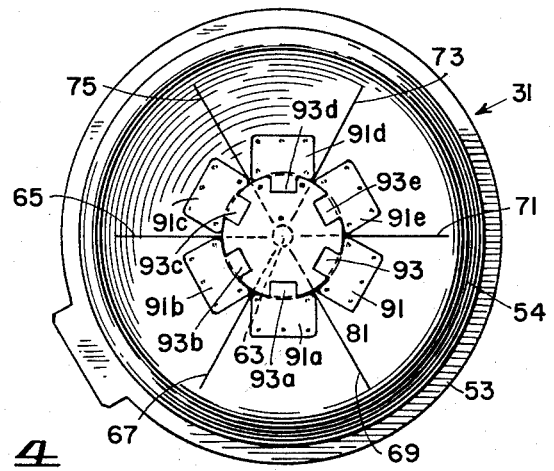
FIG. 4 is a bottom plan view of the vacuum support showing particularly the construction adjacent the center thereof.

While I have shown a small opening 61 in the center of the support, this is primarily for ease in manufacture and my disc may be constructed without such an opening therein. However, when the support is formed with opening 61, I preferably provide a concavo-convex disc 81 (FIGS. 1 and 2) which is located beneath the crown of the dome and overlaps the narrower ends of the segments formed in the dome, being preferably spot welded to one of the segments as indicated in FIG 4.

Figure 2:
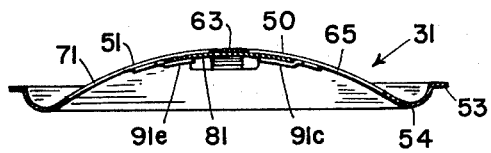
FIG. 2 is a sectional elevation of the vacuum support shown in FIG. 1.

A plurality of small T-shaped clips 91, 91a, 91b, 91c, 91d and 91e (FIG. 3) are secured to the undersurface of the segments, by welding or other suitable means, and have wing portions 93, 93a, 93b, 93c, 93d and 93e, respectively, underlying and supporting the marginal portion of disc 81. Button 63 is preferably of the same thickness as support 31 and when positioned in opening 61 is supported by disc 81, as shown in FIG. 2. Thus, disc 81 and button 63 provide a smooth, uninterrupted spherical surface for the dome or central portion of support 31 which is accurately mated to the undersurface of the rupture disc.

Since supporting member 31 has a substantially smooth outer surface, there are no slots or holes into which the rupture disc can be drawn, and as a result, the rupture disc is not weakened by working back and forth as has been the case in the past with supporting members having slots, holes or depressions therein. Consequently, the useful life of the rupture disc is greatly increased, particularly when it is used on equipment operating under vacuum or negative pressure. Although the fissures between the respective segments and the fissure between central button 63 and the central portion of the support are perceptible to the eye, the fissures do not cause any surface irregularities which can be felt. Consequently, my device will support the rupture disc substantially throughout the full area thereof in the same manner as would a completely uninterrupted supporting member.

In operation, the rupture disc and vacuum support are assembled in their positions shown in FIG. 1 in the normal way. Under normal nonrupturing pressures, the rupture disc and vacuum support remain intact. Vacuum or negative pressures acting on the rupture disc and tending to deform it inwardly will be resisted by supporting member 31. However, when a pressure higher than that which the rupture disc is made to withstand, acts on the inner side of the assembly, the segments of support 31 will separate along the lines of weakening formed by the fissures, and the unslitted portion adjacent center will tear and the concavo-convex disc 81, if the support is of the type having a central opening 61 and button 63, will release the segments allowing the same to bend upwardly and outwardly with the rupture disc to relieve the pressure.

Figure 5:
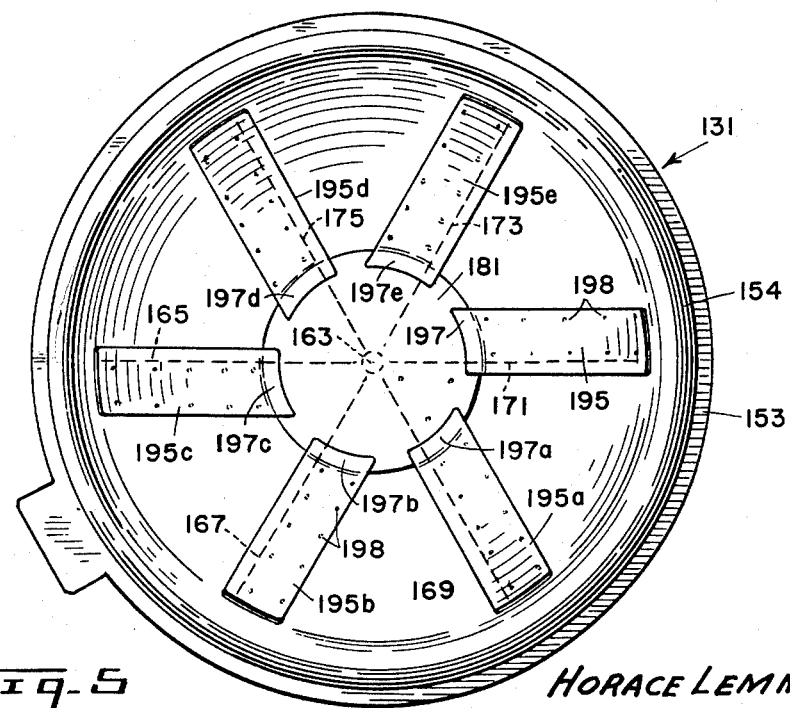
FIG. 5 is an enlarged bottom plan view of a vacuum support having a slightly modified construction.

In FIG. 5, I have shown a slightly modified form of supporting member which is particularly well adapted for use with a rupture disc of larger diameter. The support shown in FIG. 5 is similar in construction to that shown in the preceding figures and described above so that similar parts are indicated by a reference character which is 100 units higher than the corresponding reference character used in the preceding figures. Support 131 differs from support 31 in that a series of metal slats or strips 195, 195a, 195b, 195c, 195d and 195e are provided underneath the domed portion of support 131 and are positioned to underlie the slits or fissures 171, 169, 167, 165, 175 and 173, as shown. Each of slats 195 has an offset foot portion 197, 197a, 197b, 197c, 197d and 197e which underlies and supports concavo-convex disc 181. Slats 195–195e are preferably spotwelded as at 198 to one segment while underlying and supporting the adjacent segment.

Thus, it will be seen that my invention provides a novel vacuum support in which the surface supporting the rupture disc is fabricated with radially extending slits or fissures and with no central opening. In fabrication, the slits are produced without loss of metal and, therefore, the support provides a completely uninterrupted smooth, spherical surface for fully supporting the rupture disc. As member 31 has no central opening, it particularly supports the rupture disc in the center portion thereof which is the most sensitive portion and that which is most likely to deflect or rupture, due to the fact that in the formation of the disc, the center portion becomes thinner than the adjacent portions as a result of the natural stretching of the metal during manufacture.

In addition, it has generally been found that with vacuum supports of known construction, particularly the larger sizes, it has not been possible to provide a support which is strong enough to resist deformation under a vacuum, and yet which is capable of yielding when the overpressure exceeds a predetermined point to allow the rupture disc to give way and relieve the pressure. This is due primarily to the fact that heretofore it has been necessary to form the vacuum support of metals from .025–.045" thick. However, with my vacuum support having segmental slats overlying the fissures, as in FIG. 5, the support may be of thinner material, as for example from .015–.022" and while it will adequately support the disc against inward movement, it will yield at proper pressure and thus will not interfere with the action of the rupture disc. In addition, my disc may be of sufficiently thin material that it will completely conform to curved clamping surfaces and can thus be properly sealed against either positive or negative pressures.

It will thus be seen that the invention accomplishes its objects and while it has been herein disclosed by reference to the details of preferred embodiments, it is to be understood that such disclosure is intended in an illustrative, rather than a limiting sense, as it is contemplated that various modifications in the materials and method steps will readily occur to those skilled in the art, within the spirit of the invention and the scope of the appended claims.

I claim:

1. A dome-shaped rupture disc vacuum support comprising an integral thin body having a dome-shaped wall adapted to conform to the dome-shaped surface of the rupture disc, a plurality of fissures through the wall converging inwardly from an unbroken outer marginal connecting part to a narrow unbroken central connecting part, said fissures defining a plurality of sections extending between said connecting parts, each fissure extending completely through the wall with the sides of the adjacent sections defined by each fissure touching whereby the wall provides a substantially continuous supporting surface weakened at the fissures to allow the sections to part under pressure, said support having an opening adjacent the center thereof, the edges of said opening being spaced from the inner ends of said inwardly converging fissures by said unbroken central connecting part, and a member positioned in said opening for closing said opening and providing said support with a substantially continuous supporting surface adjacent the center thereof.

2. A vacuum support as set forth in claim 1 wherein said member comprises a metal button having substantially the same thickness as the adjacent portions of said support for filling said opening, a concavo-convex disc underlying said unbroken central connecting part to cover said opening, and means for supporting said concavo-convex disc in position against the undersurface of the central connecting part of said support for holding said metal button in alignment with adjacent portions of said support.

3. A dome-shaped rupture disc vacuum support comprising an integral thin body having a dome-shaped wall adapted to conform to the dome-shaped surface of the rupture disc, a plurality of fissures through the wall converging inwardly from an unbroken outer marginal connecting part to a narrow unbroken central connecting part, said fissures defining a plurality of sections extending between said connecting parts, each fissure extending completely through the wall with the sides of the adjacent sections defined by each fissure touching whereby the wall provides a substantially continuous supporting surface weakened at the fissures to allow the sections to part under pressure, said support having an opening adjacent the center thereof, the edge of said opening being spaced from the inner ends of said inwardly converging fissures by said unbroken connecting part, a metal button having substantially the same thickness as adjacent portions of said support positioned in said opening, a concavo-convex disc underlying said unbroken central connecting part to cover said opening and being spotwelded to one of said sections, and a plurality of supporting clips, each of said clips being spotwelded to one of said sections and overlapping the margin of said concavo-convex disc for retaining it in position and holding said metal button in position in said central opening.

4. A dome-shaped rupture disc vacuum support, comprising an integral thin body having a dome-shaped wall adapted to conform to the dome-shaped surface of the rupture disc, a plurality of fissures through the wall converging inwardly from an unbroken outer marginal connecting part to a narrow unbroken central connecting part, said fissures defining a plurality of sections extending between said connecting parts, each fissure extending completely through the wall with the sides of the adjacent sections defined by each fissure touching whereby the wall provides a substantially continuous supporting surface weakened at the fissures to allow the sections to part under pressure, said support having an opening adjacent the center thereof, the edge of said opening being spaced from the inner ends of said inwardly converging fissures by said unbroken central connecting part, a concavo-convex disc underlying said central connecting part, and a plurality of metal slats, each of said metal slats being secured along one side thereof to one of said sections and underlying the fissure between said section and the next adjacent section, each of said slats having a portion adjacent the inner end underlying said concavo-convex disc for holding the same in position, said sections being movably upwardly to relieve the pressure upon the rupturing of said rupture disc.

5. A safety device of the character described including a frangible dome-shaped diaphragm having an annular flange, clamping members encircling the diaphragm and having clamping portions for clamping the said flange, a supporting member for the diaphragm having a dome shape adapted to engage within the dome portions of the diaphragm and having an unbroken central portion and an outer unbroken marginal portion, said central portion having a central opening, means filling said opening and supported therein by means connected to said central portion but being adapted to separate therefrom when the diaphragm ruptures, and an annular flange extending from said marginal portions between the clamping portions of the clamping members in juxtaposition with the flange of the diaphragm, said supporting member having fissures extending through the domed portion from said central portion to said marginal portion to provide a plurality of tongues joined together at their bases and tips but separated and touching at their sides and adapted to open under rush of fluid pressure when the diaphragm ruptures responsive to a predetermined pressure against the diaphragm, said fissures terminating short of the marginal portion and short of the central portion of the supporting member.

6. A dome-shaped rupture disc vacuum support adapted to support a rupture disc against distortion and mechanical deformation comprising an integral thin body having a dome-shaped wall provided with an upper part and a lower part and adapted to conform substantially to the dome-shaped surface of the rupture disc, a plurality of fissures through said wall converging inwardly from an unbroken margin at the lower part to a central upper part of the wall and defining a plurality of sections extending between said upper and lower parts of the wall, each fissure extending completely through the wall with the sides of the adjacent sections defined by each fissure touching whereby the wall provides a substantially continuous, smooth, supporting surface weakened at the fissures to allow the sections to part under positive pressure, said support having an opening in the wall adjacent the center thereof, the edges of said opening being defined by the sections of the wall at the upper central part thereof, and a member positioned in said opening for closing the same and providing said support with a substantially continuous, smooth, supporting surface adjacent the center thereof.

References Cited in the file of this patent

UNITED STATES PATENTS

| | | |
|---|---|---|
| 2,523,068 | Simpson et al. | Sept. 19, 1950 |
| 2,548,744 | Simms | Apr. 10, 1951 |
| 2,574,714 | Smith | Nov. 13, 1951 |
| 2,716,506 | Fike | Aug. 30, 1955 |
| 2,861,334 | Baker et al. | Nov. 25, 1958 |
| 2,868,412 | Coffman | Jan. 13, 1959 |
| 2,875,921 | Coffman | Mar. 3, 1959 |
| 2,980,286 | Coffman | Apr. 18, 1961 |